(12) United States Patent
Bae et al.

(10) Patent No.: US 7,664,069 B2
(45) Date of Patent: Feb. 16, 2010

(54) METHOD AND SYSTEM FOR PREVENTING CALL DROP BY LIMITING SEARCH TIME OF 1X SYSTEM DURING 1X EV-DO SYSTEM TRAFFIC STATE

(75) Inventors: Seongsoo Bae, Seongnam-si (KR); Seongwoo Kim, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 661 days.

(21) Appl. No.: 10/541,242
(22) PCT Filed: Dec. 12, 2003
(86) PCT No.: PCT/KR03/02723

§ 371 (c)(1),
(2), (4) Date: Feb. 28, 2006

(87) PCT Pub. No.: WO2004/059858

PCT Pub. Date: Jul. 15, 2004

(65) Prior Publication Data

US 2006/0153139 A1 Jul. 13, 2006

(30) Foreign Application Priority Data

Dec. 30, 2002 (KR) .................. 10-2002-0087427
Aug. 4, 2003 (KR) .................. 10-2003-0053896

(51) Int. Cl.
*H04W 4/00* (2009.01)
*H04M 1/00* (2006.01)
*H04W 72/00* (2009.01)

(52) U.S. Cl. .................. 370/329; 455/552.1
(58) Field of Classification Search .......... 370/310, 370/329, 331; 455/434, 436–437, 450, 464, 455/552.1, 553.1

See application file for complete search history.

(56) References Cited

U.S. PATENT DOCUMENTS

| | | | |
|---|---|---|---|
| 6,711,144 B1* | 3/2004 | Kim et al. ......... | 370/335 |
| 7,340,251 B1* | 3/2008 | McClure ............ | 455/434 |
| 2002/0068564 A1* | 6/2002 | Gustavsson et al. ....... | 455/435 |
| 2008/0125168 A1* | 5/2008 | Glazko et al. ........... | 455/552.1 |

FOREIGN PATENT DOCUMENTS

| | | |
|---|---|---|
| JP | 2001-145156 | 5/2001 |
| JP | 2002-527987 | 8/2002 |
| JP | 2002-300644 | 10/2002 |
| JP | 2002-319886 | 10/2002 |
| WO | WO-00/72609 A1 | 11/2000 |
| WO | WO01/67794 | 9/2001 |
| WO | WO-02/47399 A2 | 6/2002 |

OTHER PUBLICATIONS

Japanese Office Action dated Nov. 25, 2008, for Japanese application No. 2005-509763.
3G, "cdma2000 High Rate Packet Data Air Interface Specification," version 4.0, pp. 1-3-1-4, 6-101-6-117 (2002).

* cited by examiner

*Primary Examiner*—Patrick N Edouard
*Assistant Examiner*—Michael T Thier
(74) *Attorney, Agent, or Firm*—Lowe Hauptman Ham & Berner, LLP

(57) ABSTRACT

Disclosed is a method and a system for preventing a call drop by limiting a search time for a 1X system during a 1xEV-DO system traffic state. The system comprises a hybrid access terminal, supporting both a 1xEV-DO system and a 1X system, for periodically switching over to the 1X system while in traffic with the 1xEV-DO system, updating an overhead message, checking a search time and switching over to the 1xEV-DO system based on a result of the search time; a base station transceiver subsystem including a 1xEV-DO transceiver subsystem for exchanging a packet data with the hybrid access terminal and a 1X transceiver subsystem for exchanging a voice or data with the hybrid access terminal; a base station controller including a 1xEV-DO controller for controlling a packet data transmission service of the 1xEV-DO transceiver subsystem and a 1X controller for controlling transmission service of the 1X transceiver subsystem; and a packet data serving node connected to the 1xEV-DO controller for exchanging the packet data with the 1xEV-DO system.

21 Claims, 6 Drawing Sheets

US 7,664,069 B2

METHOD AND SYSTEM FOR PREVENTING CALL DROP BY LIMITING SEARCH TIME OF 1X SYSTEM DURING 1X EV-DO SYSTEM TRAFFIC STATE

FIELD OF THE INVENTION

The present invention relates to a method and a system for preventing a call drop by limiting a search time for a 1X system during a 1xEV-DO system traffic state, and more particularly to a method and a system capable of preventing a call drop of a hybrid access terminal, which is performed by a 1XEV-DO system because the hybrid access terminal stays in a 1X mode exceeding a predetermined time, by limiting a search time of the hybrid access terminal in traffic with the 1xEV-DO system within a predetermined time when the hybrid access terminal searches a 1X system for a predetermined period of time.

BACKGROUND OF THE INVENTION

Mobile communication systems have been greatly advanced through $1^{st}$ generation analog-type advanced mobile phone systems (AMPS) and $2^{nd}$ generation cellular/personal communication service (PCS) systems. Recently, international mobile telecommunication-2000 (IMT-2000) systems have been developed and are widely used as $3^{rd}$ generation high-rate data communication systems.

The 3GPP2 ($3^{rd}$ Generation Partnership Project2), which is a collaborative international standardization group, offers standards of a CDMA IMT-2000 system as IMT-2000 standards in order to provide multimedia mobile communication services. According to the above standards, a high rate packet data system called "1xEV (evolution)" based on an HDR (high data rate) proposed by Qualcom Incorporated, has been decided upon as an international standard high rate packet data system. A CDMA 2000 1xEV-DO (data optimized or data only) system has been upgraded from a CDMA 2000 1X system and is designed to transmit only data.

In the following description, the CDMA 2000 1X system is simply referred to as "1X system" and the CDMA 2000 1xEV-DO system is simply referred to as "1xEV-DO system" for the convenience of explanation.

The 1X system utilizes both circuit networks and packet networks and provides high-rate data services with a maximum transmission rate of 307.2 Kbps. In contrast, the 1xEV-DO system is dedicated for packet data and provides high-rate packet data services with a maximum transmission rate of 2.4 Mbps.

Currently, the 1xEV-DO system has been used together with the conventional 1X system. That is, both of the 1xEV-DO system and the conventional 1X system are installed in one wireless base station or a base station controller even though they are operated separately from each other. In other words, a transceiver of the wireless base station includes a channel card for the 1xEV-DO system and a channel card for the 1X system, respectively. In addition, the base station controller includes a data processing board for processing packet data transmitted from the 1xEV-DO system and a data processing board for processing data transmitted from the 1X system, respectively.

High-rate data are transmitted to a mobile communication terminal from a mobile communication system, such as the wireless base station or the base station controller, through the 1xEV-DO system. In addition, voice signals or low-rate data are transmitted to the communication terminal through the 1X system.

A hybrid access terminal capable of receiving communication services transmitted from the mobile communication system having both 1xEV-DO system and 1X system may periodically monitor each of the 1xEV-DO and 1X systems in a predetermined period of time. That is, the hybrid access terminal periodically and alternately searches the 1xEV-DO and 1X systems in an idle mode thereof and periodically searches the 1X system when the hybrid access terminal is in traffic with the 1xEV-DO system.

Particularly, the hybrid access terminal in traffic with the 1xEV-DO system periodically accesses to the 1X system and updates system resources, such as system messages and access messages, in order to respond to low-data call signals, such as voice call-accepted signals and short messages, which may be transmitted to the hybrid access terminal from the 1X system.

However, the hybrid access terminal must stay in the 1X system until the system resources have been completely updated whenever the hybrid access terminal periodically accesses to the 1X system even if the hybrid access terminal is in traffic with the 1xEV-DO system.

In addition, the 1xEV-DO system may perform a call drop operation if the 1xEV-DO system does not receive a signal from the hybrid access terminal within a predetermined period of time (for example, 5.12 seconds) when the hybrid access terminal is in traffic with the 1xEV-DO system. That is, regardless of reasons thereof, if the 1xEV-DO system searches no signal from the hybrid access terminal within the predetermined period of time, the 1xEV-DO system performs the call drop operation with respect to the hybrid access terminal in order to efficiently utilize the system resources.

However, the call drop may lower reliability of communication services and cause inconvenience and troubles to users, who do not want the call drop with respect to the 1x EV-DO system.

SUMMARY OF THE INVENTION

Therefore, the present invention has been made in view of the above-mentioned problems, and it is an object of the present invention to provide a method and a system capable of preventing a call drop of a hybrid access terminal, which is performed by a 1XEV-DO system because the hybrid access terminal stays in a 1X mode exceeding a predetermined time, by limiting a search time of the hybrid access terminal in traffic with the 1xEV-DO system within a predetermined time when the hybrid access terminal searches a 1X system for a predetermined period of time.

In order to accomplish this object, according to an aspect of the present invention, there is provided a system for preventing a call drop from occurring between a CDMA 2000 1xEV-DO (Evolution-Data Optimized) system and a hybrid access terminal in traffic with the CDMA 2000 1xEV-DO system, by limiting a predetermined search time for a 1X system, the system comprising: the hybrid access terminal operated in a 1X mode in relation to the 1X system for receiving a voice signal transmission service or a low-rate data transmission service from the 1X system and in a 1xEV-DO mode in relation to the 1xEV-DO system for receiving a high-rate data transmission service from the 1xEV-DO system, the hybrid access terminal in traffic with the 1xEV-DO system being periodically switched into the 1X mode so as to update overhead messages and returned to the 1xEV-DO mode if the predetermined search time lapses; a base station transceiver subsystem including a 1xEV-DO access network transceiver for transmitting/receiving packet data to/from the hybrid access terminal and a 1X transceiver for transmitting/receiving voice or data to/from the hybrid access terminal; a base station controller including a 1xEV-DO access network controller for controlling a packet data transmission service of the 1xEV-DO access network transceiver and a 1X controller for controlling a transmission service of the 1X transceiver; and a packet data serving node (PDSN) connected to the 1xEV-DO access network controller so as to transmit/receive the packet data to/from the 1xEV-DO system.

In order to accomplish this object, according t another aspect of the present invention, there is provided a method for preventing a call drop from occurring between a CDMA 2000 1xEV-DO (Evolution-Data Optimized) system and a hybrid access terminal in traffic with the CDMA 2000 1xEV-DO system, by limiting a predetermined search time for a 1X system, the method comprising the steps of: (a) sequentially initializing a 1X mode and a 1xEV-DO mode of the hybrid access terminal such that the hybrid access terminal stays in an idle state; (b) alternately and periodically performing monitoring with respect to the 1X system and the 1xEV-DO by using the hybrid access terminal in a state that the hybrid access terminal stays in the idle state; (c) allowing the hybrid access terminal to enter a traffic state of the 1xEV-DO mode such that a connection and a session are formed between the hybrid access terminal and the 1xEV-DO system, thereby enabling the hybrid access terminal to transmit/receive packet data to/from the 1xEV-DO system; (d) switching the hybrid access terminal into the 1X mode if a predetermined monitoring time lapses; (e) checking a switching time and detecting signals of the 1X system when the hybrid access terminal is switched into the 1X mode; and (f) allowing the hybrid access terminal to return to the 1xEV-DO mode if the switching time reaches a predetermined return start time.

In order to accomplish this object, according to still another aspect of the present invention, there is provided a hybrid access terminal for preventing a call drop from occurring between a CDMA 2000 1xEV-DO (Evolution-Data Optimized) system and the hybrid access terminal in traffic with the CDMA 2000 1xEV-DO system, the hybrid access terminal comprising: a timer for measuring a switching time when the hybrid access terminal is switched from the 1xEV-DO mode to the 1X mode; a searcher module for tracking and converting frequency so as to perform the switching of the hybrid access terminal between the 1X mode and the 1xEV-DO mode, and receiving overhead messages; a finger module for demodulating the overhead messages received from the searcher module; and a mobile station modem (MSM) chip alternately and periodically searching the 1xEV-DO system and the 1X system, creating a return control signal if the MSM chip receives a return start signal from the timer while searching the 1X system, and delivering the return control signal to the searcher module.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference will now be made in detail to the preferred embodiments of the present invention.

In the following description of the present invention, a detailed description of known functions and configurations incorporated herein will be omitted when it may make the subject matter of the present invention rather unclear.

Figure 1:
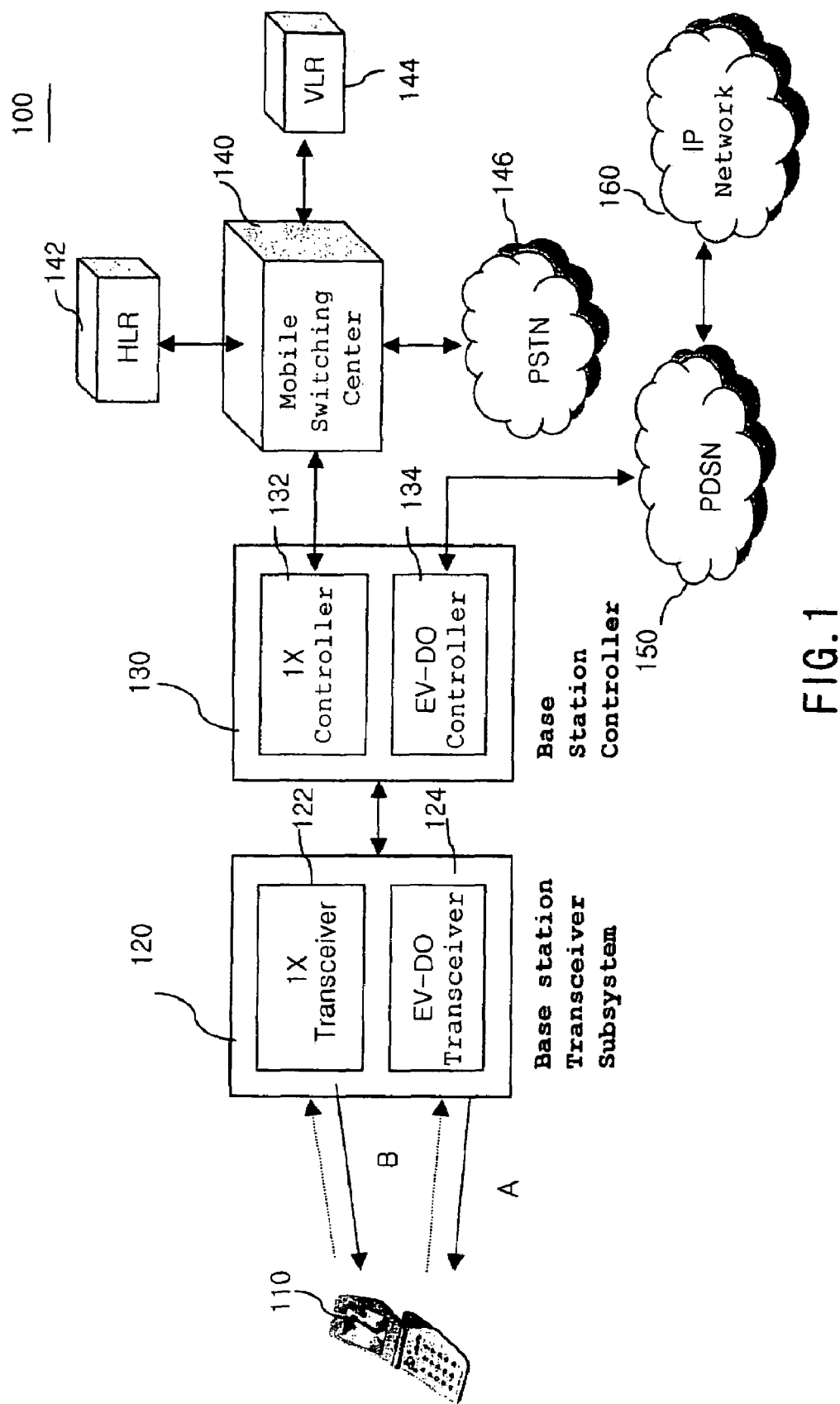
FIG. 1 is a schematic block view showing a system for preventing a call drop of a hybrid access terminal by limiting a search time of the hybrid access terminal for searching a 1X system according to an exemplary embodiment of the present invention.

FIG. 1 is a schematic block view showing a system 100 for preventing a call drop of a hybrid access terminal 110 by limiting a search time of the hybrid access terminal 110 for searching a 1X system according to an exemplary embodiment of the present invention.

As shown in FIG. 1, the system 100 of the present invention includes both 1xEV-DO system and 1X system. That is, the system 100 has the 1X system making communication with a hybrid access terminal 110 and consisting of a 1X transceiver 122, a 1X controller 132, and a mobile switching center (MSC) 140 in order to transmit voice and data. In addition, the system 100 has the 1xEV-DO system making communication with the hybrid access terminal 110 and consisting of a 1xEV-DO access network transceiver subsystem (ANTS) 124, a 1xEV-DO access network controller (ANC) 134, a packet data serving node (hereinafter, simply referred to as PDSN) 150, and an IP (internet protocol) network in order to transmit data only.

The hybrid access terminal 110 is divided into two parts so that the hybrid access terminal 110 can receive a voice service and a low-rate data service from the 1X system and receive a high-rate data service from the 1xEV-DO system, separately. The hybrid access terminal 110 is switched into a 1X mode when the hybrid access terminal 110 is in an idle state in such a manner that the hybrid access terminal 110 can make communication with the 1X system. In this state, the hybrid access terminal 110 is periodically switched into a 1xEV-DO mode in a predetermined period of time so as to check whether or not data are received through the 1xEV-DO system and returns to the 1X mode. According to the exemplary embodiment of the present invention, the hybrid access terminal 110 in traffic with the 1xEV-DO system is switched into the 1X mode (which is called "switch") and is again switched into the 1xEV-DO mode (which is called "return').

The switch and return functions operating between the 1xEV-DO system and the 1X system are controlled by means of software stored in a mobile station modem (MSM) chip, which is a kind of a baseband modem chip accommodated in the hybrid access terminal 110. In addition, the switch and return functions are achieved by tracking frequencies of each network using a searcher connected to the MSM chip. That is, when the hybrid access terminal 110 is switched from the 1xEV-DO mode to the 1X mode, a searcher module tracks the frequency of the 1X system under the control of the MSM chip. In addition, when the hybrid access terminal 110 returns to the 1xEV-DO mode from the 1X mode, the searcher module tracks the frequency of the 1xEV-DO system.

When the hybrid access terminal 110 receives data from the 1xEV-DO system in the 1xEV-DO mode, a great amount of data may be received in the hybrid access terminal 110 since the hybrid access terminal 110 receives high-rate data in the 1xEV-DO mode. Accordingly, in a case of a forward link for transmitting data from an access network (AN) to the hybrid access terminal 110, channels divided through a CDMA (code division multiple access) method may transmit data through time slots, which are divided through a TDM (time division multiplexing) method. In contrast, in a case of a reverse link for transmitting data from the hybrid access terminal 110 to the 1xEV-DO access network transceiver subsystem 124 and the 1xEV-DO access network controller 134, data are transmitted through a conventional CDMA method for a plurality of subscribers.

In addition, the hybrid access terminal 110 receiving data in traffic with the 1xEV-DO mode is periodically switched to the 1X mode in a predetermined period of time so as to check whether or not signals, such as voice signals, are received through the 1X system and returns to the 1xEV-DO mode.

The 1X transceiver 122 and the 1xEV-DO access network transceiver subsystem 124 form a base station transceiver subsystem (BTS) 120 so as to provide mobile communication services including voice and data to the hybrid access terminal 110 through an air interface. That is, the base station transceiver subsystem 120 transmits voice or data to the hybrid access terminal 110 through the 1X transceiver 122 and transmits only packet data to the hybrid access terminal 110 through the 1xEV-DO access network transceiver subsystem 124.

The 1X controller 132 and the 1xEV-DO access network controller 134 form a base station controller (BSC) 130 for controlling an operation of the base station transceiver subsystem 120. That is, the 1X controller 132 for controlling transmission of voice or data sends voice and/or data transmitted from the 1X transceiver 122 to the mobile switching center 140 and the 1xEV-DO access network controller 134 sends data transmitted from the 1xEV-DO access network transceiver subsystem 124 to the PDSN 150.

The mobile switching center 140 physically connects a plurality of 1X controllers 132 to another mobile switching center or to a public switched telephone network (PSTN) 146 so as to provide a communication access route of the 1X system with respect to a communication call transmitted from the hybrid access terminal 110.

In addition, the mobile switching center 140 processes call signals of subscribers by obtaining profile information of the hybrid access terminal 110 from a home location register (hereinafter, simply referred to as "HLR") 132, which is a database storing information of hybrid access terminals registered in the mobile switching center 140, and a visitor location register (hereinafter, simply referred to as "VLR") 134, which is a database storing information of hybrid access terminals 110 located in a region of the mobile switching center 140. Herein, profile information includes a mobile identification numbers (MIN), an electrical serial number (ESN), and supplementary services.

The 1xEV-DO system, which is a high-rate packet data system, is connected to the PDSN 150 based on TCP/IP so as to transmit/receive vario s data in the form of IP packets to/from an IP network 160. In addition, the 1xEV-DO system receives packet data from the IP network 160 and transmits the packet data to the hybrid access terminal 110 through time slots, which are divided through a TDM method. In addition, the 1xEV-DO system receives CDMA data, which are modulated through a CDMA method, from the hybrid access terminal 110, creates packet data by using the CDMA data, and transmits the packet data to the PDSN 150.

In a case of a forward link, the 1xEV-DO system transmits data with maximum power thereof without using a power control of a wireless base station while providing only a hard handoff function. However, in a case of a reverse link, the power control is carried out in each terminal while providing a soft handoff function as well as the hard handoff function.

Figure 2A:
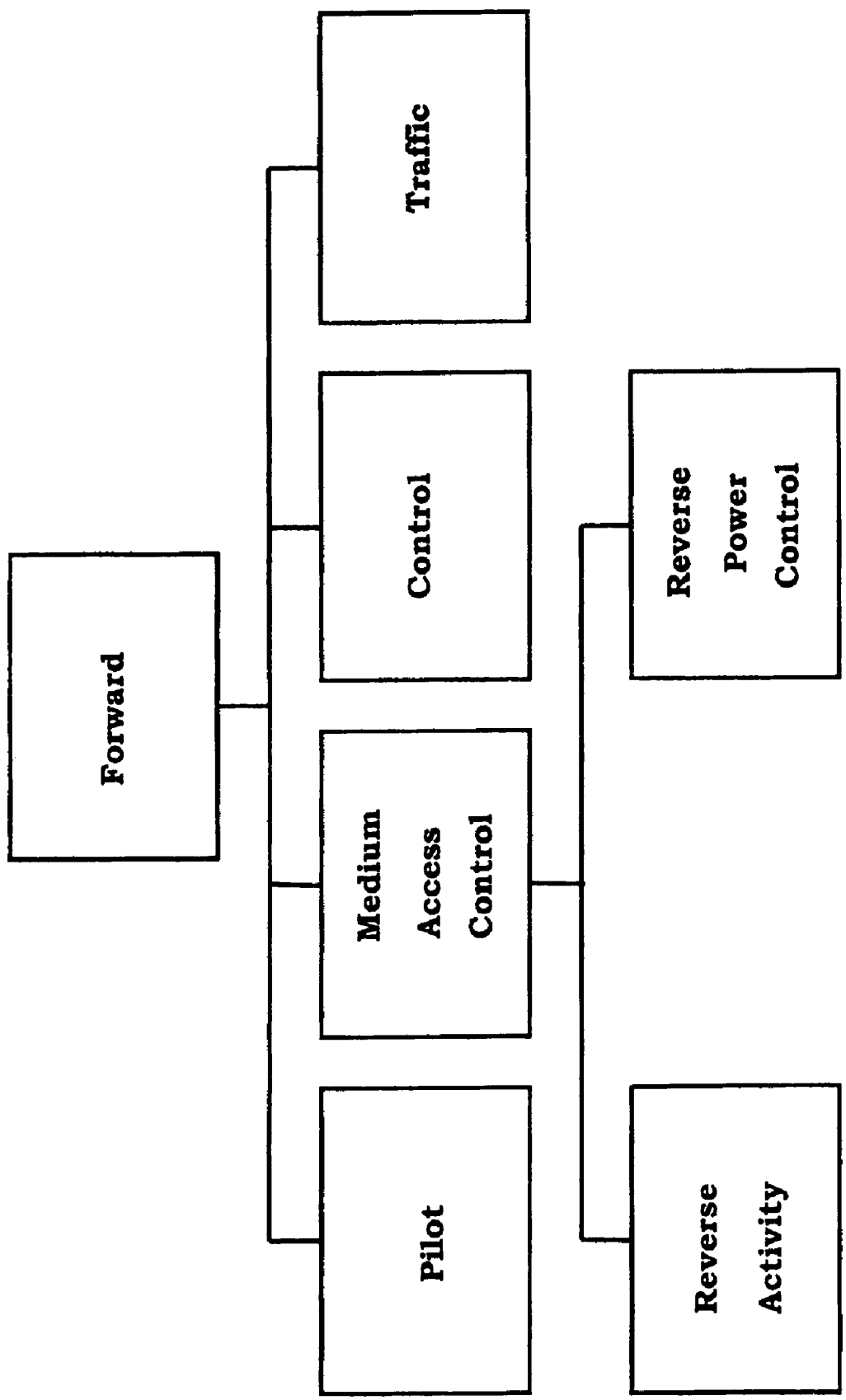
FIGS. 2A and 2B are block views showing a channel structure of a forward link for transmitting data to a hybrid access terminal through a 1xEV-DO access network transceiver subsystem.
Figure 2B:
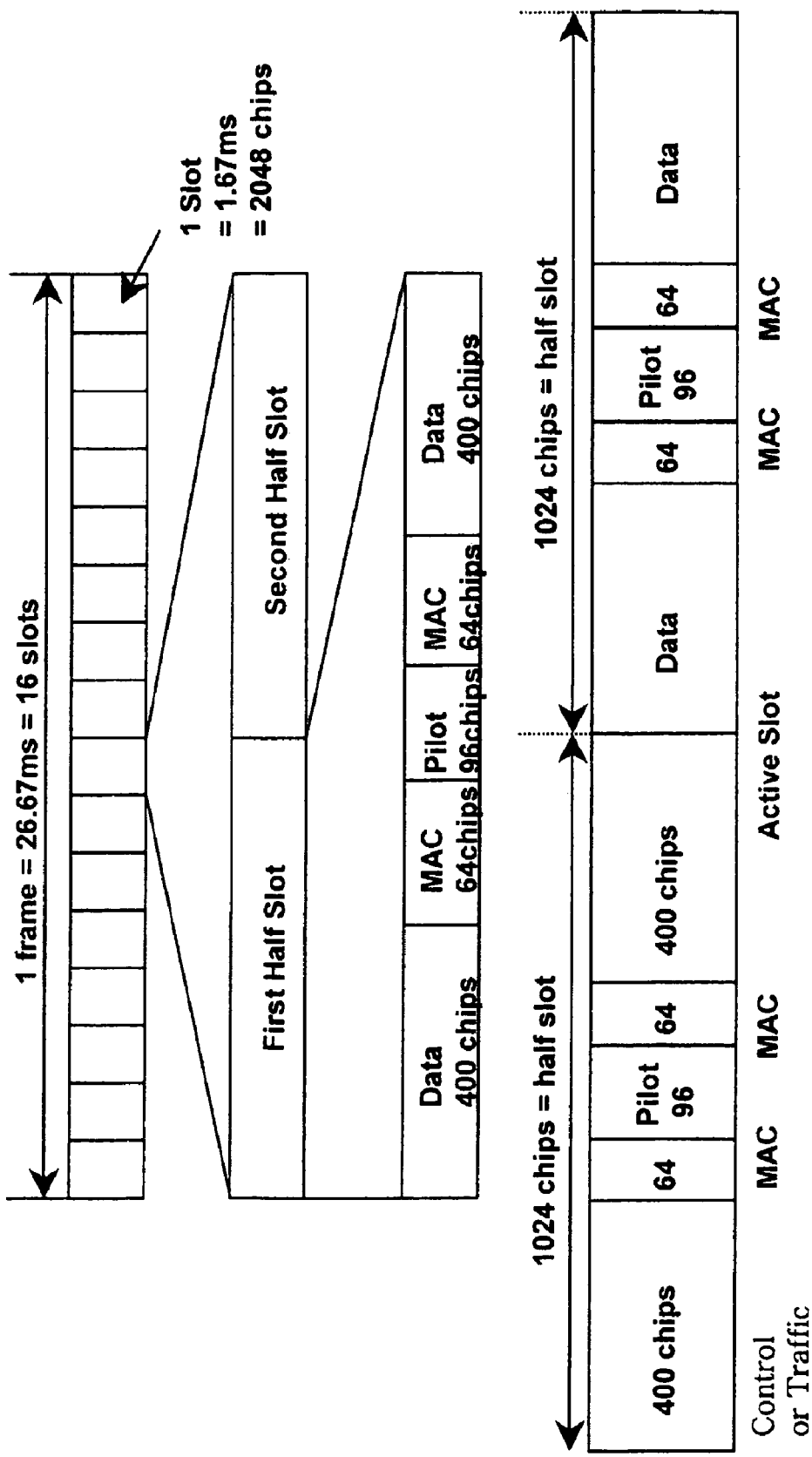

FIGS. 2A and 2B are block views showing a channel structure of a forward link for transmitting data to the hybrid access terminal 110 through the 1xEV-DO access network transceiver subsystem 124.

As shown in FIG. 2A, the forward link includes a pilot channel, a medium access control (MAC) channel, a control channel, and a traffic channel. The pilot channel is provided to transmit a pilot signal for allowing the 1xEV-DO system to track the hybrid access terminal 110. The hybrid access terminal 110 receives at least one pilot signal through the pilot channel and accesses to a wireless base station, which has transmitted a pilot signal having greatest intensity. In addition, the pilot channel is used as a reference for coherent detection of the wireless base station having the 1xEV-DO system by means of the hybrid access terminal 110.

The MAC channel is mainly used for controlling the reverse link and includes a reverse activity (RA) channel and a reverse power control (RPC) channel. Herein, the RA channel is used for determining a transmission rate of the reverse link. In addition, the RA channel may be used for requesting the hybrid access terminal 110 to decrease the transmission rate when channels of the reverse link are saturated. In addition, the RPC channel is used for controlling transmission power when the hybrid access terminal 110 transmits signals or data through the reverse link.

The control channel is used for transmitting a broadcast message from the 1xEV-DO system to the hybrid access terminal 110 or for transmitting a direct message in order to directly control a specific hybrid access terminal. The traffic channel is used when the 1xEV-DO system transmits only packet data to the hybrid access terminal 110.

Hereinafter, a time slot structure and a data structure in the forward link will be described with reference to FIG. 2B. Firstly, the forward link includes 16 time slots per one frame having a time interval about 26.67 ms. In addition, each of the time slots includes a first half slot having 1024 chips and a second half slot having 1024 chips, that is, the time slot has total 2048 chips. In addition, a time interval of 1.67 ms is allotted to each time slot.

In detail, each of the first half slot and second half slot includes 400 data slot chips, 64 MAC slot chips, 96 pilot slot chips, 64 MAC slot chips and 400 data slot chips.

Figure 3:
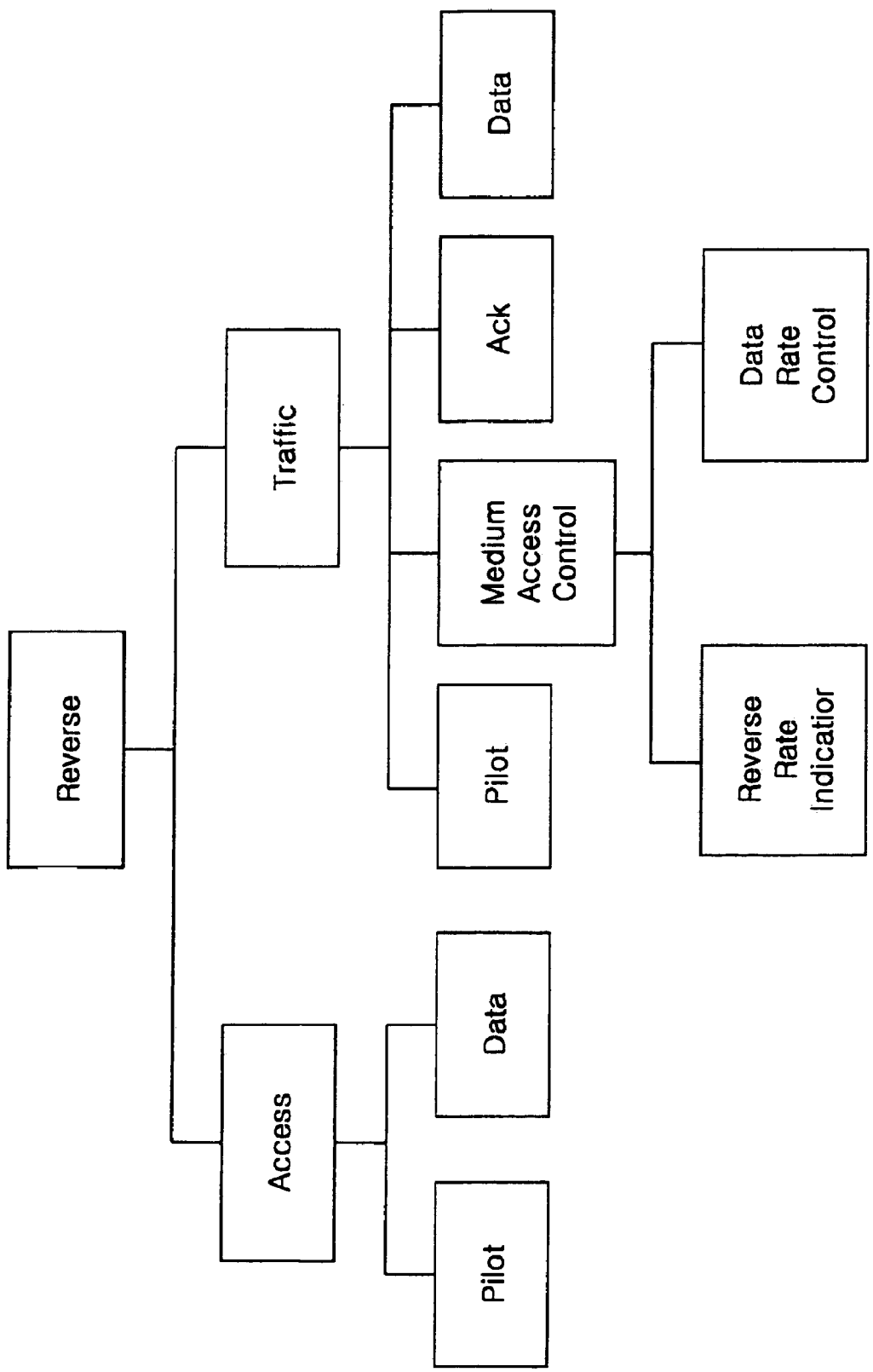
FIG. 3 is a block view showing a channel structure of a reverse link for transmitting data to a 1xEV-DO access network transceiver subsystem from a hybrid access terminal.

FIG. 3 is a block view showing a channel structure of a reverse link for transmitting data to the 1xEV-DO access network transceiver subsystem 124 from the hybrid access terminal 110.

The reverse link shown in FIG. 3 may use a CDMA method in the same manner as the 1X system and mainly include an access channel and a traffic channel. The access channel has a pilot channel and a data channel and the traffic channel has a pilot channel, a MAC channel, an Ack channel, and a data channel. Herein, the MAC channel is again divided into a reverse rate indicator (RRI) channel and a data rate control (DRC) channel.

The access channel is used for transmitting an origination connection_request message, and a registration route_update message. The access channel has a low transmission rate of 9.6 kbps for stability of a wireless channel.

Similar to the pilot channel in the forward link shown in FIG. 2A, the pilot channel shown in FIG. 3 is used as a reference for coherent detection of the wireless base station having the 1xEV-DO system by means of the hybrid access terminal 110. The data channel is used for transmitting data required for the hybrid access terminal 110 to access to the 1xEV-DO system.

The traffic channel is used when the hybrid access terminal 110 transmits packet data to the 1xEV-DO system. The traffic channel provides various data transmission rates depending on the wireless communication environment.

The pilot channel performs a function identical to the function of the pilot channel, which has been described with reference to the access channel. The MAC channel is used for controlling a data transmission rate of the traffic channel, so the MAC channel continuously exists while the hybrid access terminal 110 is being connected to the 1xEV-DO system. The RRI channel of the MAC channel is used for representing information of the data transmission rate of the traffic channel when the hybrid access terminal 110 transmits data through the traffic channel. An RRI value is displayed in the hybrid access terminal 110.

In addition, the DRC channel determines a data rate, which can be demodulated, depending on the channel environment of the forward link and notifies the base station of the data rate. That is, the 1xEV-DO access network transceiver subsystem 124 transmits packet data to the hybrid access terminal 110 by using time slots of the forward link. At this time, a basis for determining the transmission rate of packet data is the DRC cover value transmitted by the hybrid access terminal 110. In order to determine the DRC cover value, the hybrid access terminal 110 measures a C/I (carrier to interference) value transmitted from the 1xEV-DO access network transceiver subsystem 124 and determines the DCR cover value for the maximum transmission rate.

The Ack channel is used for transmitting a response signal for data received in the hybrid access terminal 110 through the forward link in a time slot unit. The Ack channel is adaptable for data having a short length and corresponds to a half of a length of a time slot so as to reduce interference.

The data channel is used when the hybrid access terminal 110 transfers only the packet data similarly to the data channel of the access channel.

Meanwhile, a packet, which is a basic transmission unit of the traffic channel, has a length of 26.66 ms, and a transmission bit rate thereof is varied depending on sizes of the packet. The pilot channel, traffic channel, DRC channel and the Ack channel are discriminated from each other by using a Walsh Code, which is an orthogonal code.

Figure 4:
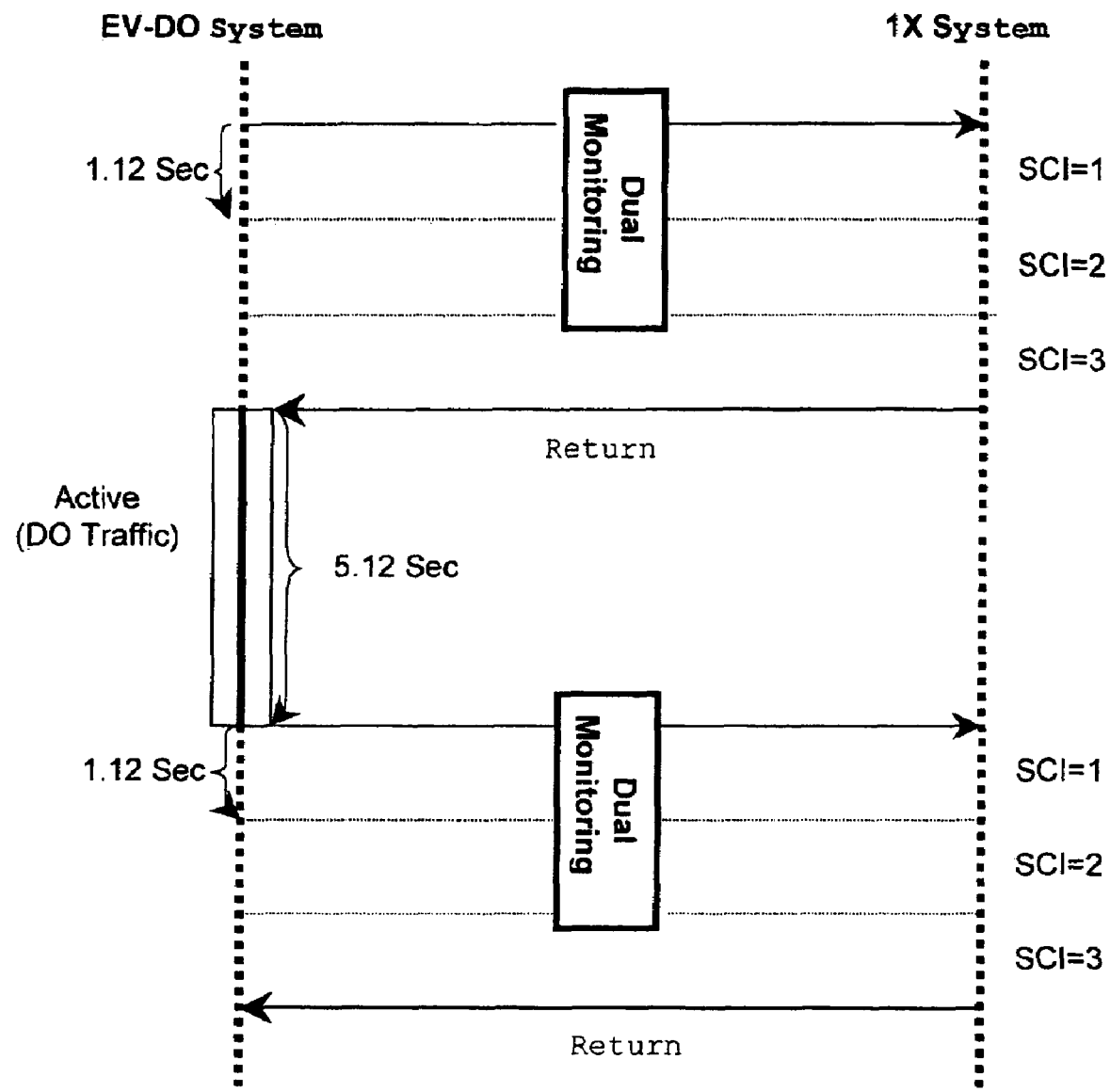
FIG. 4 is a view showing a procedure for preventing a call drop of a hybrid access terminal from a 1xEV-DO system by limiting a search time for a 1X system when a hybrid access terminal is in traffic with the 1xEV-DO system according to an exemplary embodiment of the present invention.

FIG. 4 is a view showing a procedure for preventing the call drop of the hybrid access terminal 110 from the 1xEV-DO system by limiting the search time for the 1X system when the hybrid access terminal 110 is in traffic with the 1xEV-DO system according to an exemplary embodiment of the present invention.

The search time according to an exemplary embodiment of the present invention signifies a period of time required until overhead messages have been updated in order to perform voice communication, call requests such as SMS (short message service) receiving, and a location register after the hybrid access terminal 110 in traffic with the 1xEV-DO system returns to the 1X mode.

As shown in FIG. 1, the hybrid access terminal 110, which uses packet data in traffic with the 1xEV-DO system, is switched into the 1X mode with a predetermined period of time (for example 5.12 seconds) in order to check whether or not a call is requested by the 1X system so as to search the 1X system. The hybrid access terminal 110 updates the overhead messages in order to perform a location register process and process a call request transferred from the 1X system while staying in the 1X mode.

Herein, the call request signifies that a voice call request or the SMS is transferred to the hybrid access terminal 110. Also, the overhead messages include a system parameter message, an access parameter message, an extended system parameter message, a neighbor list parameter message, and a channel list parameter message.

The system parameter message includes an NID (network ID), an SCI (slot cycle index), a packet zone ID, and so on, which are required for receiving a call. The access parameter message includes information required by the hybrid access terminal 110 in order to access to the 1X system from the 1xEV-DO system. The extended system parameter message includes system parameters, which are added when an IS (interim standard)-95B system has been upgraded to the 1X system. Also, the neighbor list parameter message includes information about cell IDS of neighbor cells adjacent to a cell, in which the hybrid access terminal 110 is located. The channel list parameter message includes information about frequency channels allowing the hybrid access terminal 110 to transmit/receive data or voices after the hybrid access terminal 110 sets up a call.

The hybrid access terminal 110 stays in the 1X mode with monitoring the 1X system until updating all overhead messages described above in a mobile telecommunication environment employing both 1xEV-DO system and 1X system. However, if the 1xEV-DO system detects no signals from the hybrid access terminal 110 within a predetermined period of time (for example, 5.12 seconds defined in a standard), the 1xEV-DO system performs the call drop with respect to the hybrid access terminal 110.

Therefore, according to the present invention, the hybrid access terminal 110 returns to the 1xEV-DO mode before a time of 5.12 seconds lapses after hybrid access terminal 110 has been switched into the 1X mode, so that the call drop between the 1xEV-DO system and the hybrid access terminal 110 switched into the 1X mode does not occur. A function described above is internally realized in the hybrid access terminal 110.

In detail, the hybrid access terminal 110 forcefully returns to the 1xEV-DO mode from the 1X mode through the MSM chip, the searcher module, a finger module, and a timer accommodated in the hybrid access terminal. The MSM chip has functions of processing and controlling various operations occurring in the hybrid access terminal 110. Also, the MSM chip controls various data, which are transmitted/received and/or inputted/outputted through the hybrid access terminal 110, the 1xEV-DO system, the 1X system, and users inputting voices or values of key buttons. In addition, the MSM chip includes a central processing unit (CPU), a vocoder for coding voices.

Accordingly, when the hybrid access terminal 110 is in traffic with the 1xEV-DO system, the MSM chip performs a monitoring operation with respect to the 1X system with periodic time interval by using software therein. Such a monitoring operation is achieved through the searcher module. That is, the searcher module performs the monitoring operation by tracking frequency of the 1X system with a predetermined time interval under the control of the MSM chip.

Meanwhile, modulation signals or data, which have been received through the searcher module while the searcher module is monitoring the 1X system, are transferred to the MSM chip. Thereafter, the MSM chip transfers the modulation signals or the data received from the searcher module to the finger module. The finger module, which has received the modulation signals or the data from the MSM chip, demodulates the modulation signals or the data by means of a CDMA demodulation method. Also, the modulation signals or data, which have been received through the searcher module while the searcher module is monitoring the 1xEV-DO system, are demodulated by means of a TDMA demodulation method.

Meanwhile, according to the spirit of the present invention, the MSM chip switches the 1xEV-DO mode into the 1X mode and operates the timer accommodated in the hybrid access terminal 110 in order to search the 1X system. If a predetermined return time of the timer lapses while receiving an operation control signal from the MSM chip so as to measure a switching time, the timer delivers a predetermined return start signal to the MSM chip.

That is, according to the spirit of the present invention, the MSM chip or the timer has predetermined return start time information allowing the hybrid access terminal 110 searching the 1X system after switching into the 1X mode to return to the 1xEV-DO mode. Accordingly, the MSM chip, which has received the predetermined return start signal from the timer, terminates an operation of searching the 1X system and creates a return control signal to transfer the return control signal to the searcher, so that the hybrid access terminal returns to the 1Xev-DO mode. At this time, the MSM chip checks whether or not the switching time measured by the timer reaches to the return start time by using the return start time stored in the MSM chip. Then, the MSM chip creates the return control signal to transfer the return control signal to the searcher.

Meanwhile, according to one embodiment of the present invention, the hybrid access terminal 110, which has been switched into the 1X mode, searches the overhead messages for a predetermined search time corresponding to "SCI=1" to "SCI=3". Herein, according to the standard, "SCI=1" corresponds to a time of 1.12 seconds, so the return start time for returning the hybrid access terminal 110 from the 1X mode to the 1xEV-DO mode is 3.36 seconds (1.12 seconds×3), which is a search termination time. In other words, if the MSM chip checks a time of 3.36 seconds by means of the timer after the hybrid access terminal 110 is switched into the 1X mode, the MSM chip stops the search operation for the 1X system and the hybrid access terminal 110 returns to the 1xEV-DO mode.

Meanwhile, when it is considered that the call drop of the 1xEV-DO system occurs when 5.12 seconds lapses after the hybrid access terminal 110 has been switched into the 1X mode, it is preferred that the search time allowing the hybrid access terminal 110 according to the present invention to search the 1X system is set to 3.36 seconds. At this time, since a time of 1.76 seconds remains until the call drop between the 1xEV-DO system and the hybrid access terminal 110 occurs, the hybrid access terminal 110 can safely return to the 1xEV-DO mode. Although, according to one embodiment of the present invention, the return start time is set as 3.36 seconds corresponding to "SCI=3", by considering a safe return of the hybrid access terminal 110, it is possible to set the return start time as 4.48 seconds corresponding to "SCI=4". In this case, since a time of 0.64 seconds remains until the hybrid access terminal 110 returns to the 1xEV-DO mode, the hybrid access terminal 110 is safely switched into the 1xEV-DO system.

Meanwhile, signals and data, which are received and demodulated when the hybrid access terminal 110 is switched into the 1X system and stays in the 1X mode, are stored in the internal memory of the hybrid access terminal 110. Accordingly, the hybrid access terminal 110 returns to the 1xEV-DO mode, operates in traffic with the 1xEV-DO system, and returns the 1X mode again after a predetermined time (for example, 5.12 seconds) lapses. At this time, if the hybrid access terminal 110 receives and demodulates only overhead messages excluding overhead messages obtained from previous search operations for the 1X system, it is possible to process a call in the 1X system.

Figure 5:
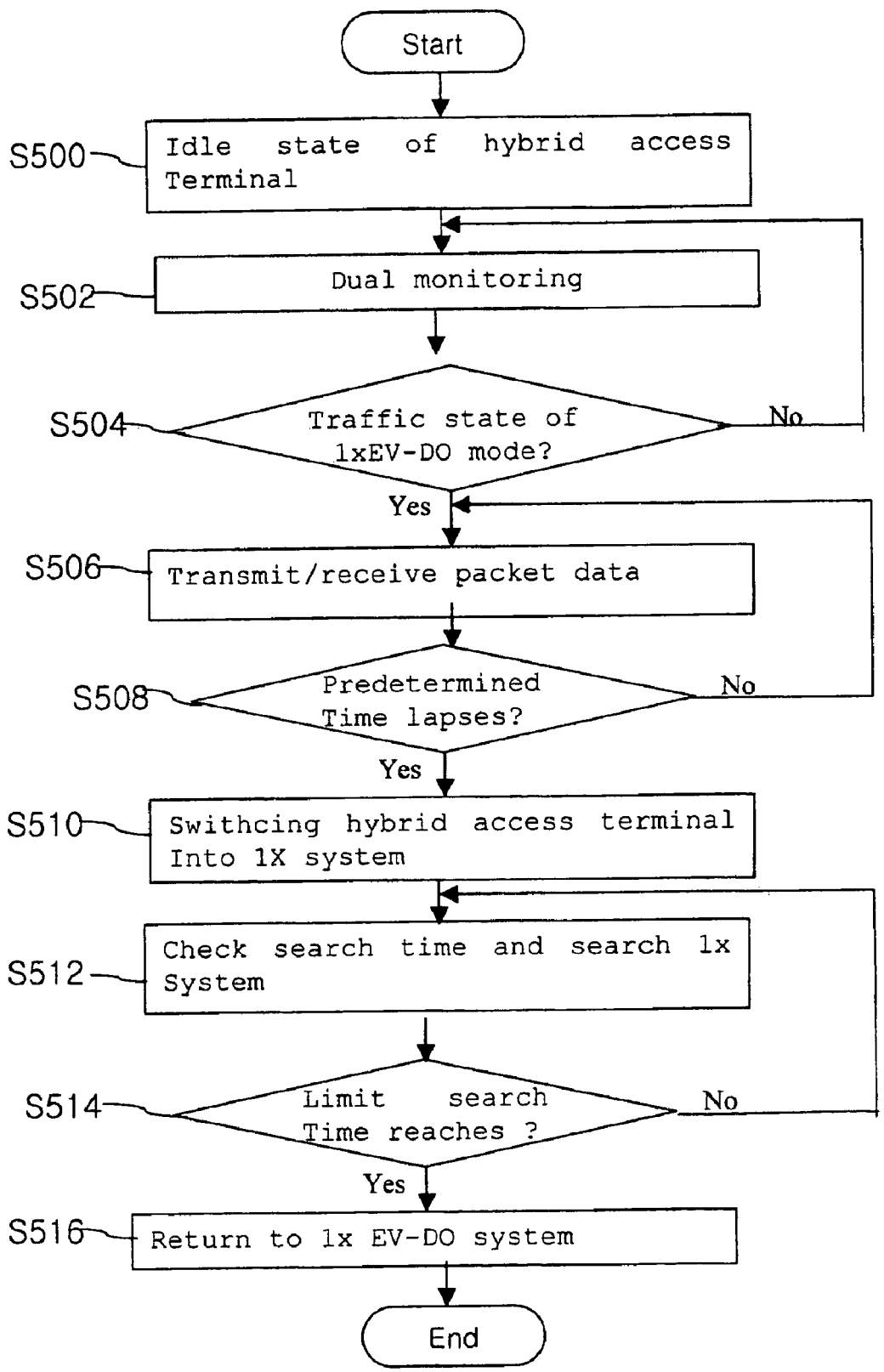
FIG. 5 is a flowchart showing a procedure for preventing a call drop between a 1xEV-DO system and a hybrid access terminal in traffic with the 1xEV-DO system by limiting a search time for a 1X system according to an exemplary embodiment of the present invention.

FIG. 5 is a flowchart showing a procedure for preventing the call drop between the 1xEV-DO system and the hybrid access terminal 110 in traffic with the 1xEV-DO system by limiting the search time for the 1X system according to an exemplary embodiment of the present invention.

When the hybrid access terminal 110 is powered on by a user, the hybrid access terminal 110 receives the pilot signals from the 1X controller 132 and the 1X transceiver 122 of the 1X system so that the 1X mode is initialized and the hybrid access terminal 110 is maintained in an idle state. In addition, the hybrid access terminal 110 initializes the 1xEV-DO mode by using a system parameter message obtained when initializing the 1X mode, and the pilot signals transmitted from the 1xEV-DO access network controller 134 and the 1xEV-DO access network transceiver subsystem 124, and then, the hybrid access terminal 110 is maintained in the idle state (S500).

After initializing the 1X mode and the 1xEV-DO mode, the hybrid access terminal 110 performs a dual monitoring between the 1X mode and the 1xEV-DO mode. In this case, the hybrid access terminal 110 monitors the 1xEV-DO system for one minute with an interval of 5.12 seconds in the 1X mode, and thereafter monitors the 1xEV-DO system with an interval of 40 seconds (S502).

Meanwhile, the hybrid access terminal 110 alternately monitors the 1X system and the 1xEV-DO system in the idle state. At this time, if data are transmitted to the hybrid access terminal 110 from the 1xEV-DO access network transceiver subsystem 124 or the user requests data to the 1xEV-DO system by operating key buttons of the hybrid access terminal 110, it is checked whether or not the 1xEV-DO mode is activated and the hybrid access terminal 110 is entered into a traffic state for receiving/transmitting data (S504). In order to allow the hybrid access terminal 110 to enter into the traffic state, a connection and a session may be formed between the hybrid access terminal 110 and the 1xEV-DO access network transceiver subsystem 124 in such a manner that the hybrid access terminal 110 may transmit/receive data to/from the 1xEV-DO access network transceiver subsystem 124.

If the hybrid access terminal 110 enters into the traffic state of the 1xEV-DO mode in step S504, the hybrid access terminal 110 transmits/receives packet data to/from the 1xEV-DO system (S506).

While transmitting/receiving packet data into/from the 1xEV-DO system in the traffic state in step S506, the hybrid access terminal 110 checks whether or not a predetermined monitoring time (for example, 5.12 seconds) lapses by using a timer accommodated in the hybrid access terminal 110 in order periodically to search the 1X system (S508).

If the hybrid access terminal 110 determines that the predetermined monitoring time lapses in step S508, the hybrid access terminal is switched into the 1X mode and start to search overhead messages of the 1X system, and so forth (S510). In this case, the hybrid access terminal 110 is switched into the 1X mode caused by operations of the MSM chip and the searcher module.

The hybrid access terminal 110 is switched into the 1X mode, operates the timer accommodated in the hybrid access terminal 110 to check the search time, and receives and demodulates the overhead messages, and so on by searching the 1X system in such a manner that the hybrid access terminal 110 can respond to a call from the 1X system (S512). While checking the search time through step S512, the hybrid access terminal 110 continuously checks whether or not the predetermined search time (for example, 3.36 seconds) lapses (S514).

If the hybrid access terminal 110 determines that the predetermined search time lapses in step S514, the hybrid access terminal 110 returns to the 1xEV-DO mode after stopping the search operation in the 1X system and storing already-received overhead messages in the memory (S516). Also, the hybrid access terminal 110, which has been returned to the 1xEV-DO mode, repeats steps S510 to S516 after the predetermined monitoring time lapses.

According to one embodiment of the present invention, it is possible to solve a problem of the call drop, which occurs between the hybrid access terminal 110 and the 1xEV-DO system when the hybrid access terminal 110 in traffic with the 1xEV-DO system searches the 1X system in order to respond to a call or to register a location in the 1X system, without using resources of the 1X system or the 1xEV-DO system.

As can be seen from the foregoing, a call drop problem conventionally happens due to various kinds of reasons when a hybrid access terminal in traffic a 1xEV-DO system searches a 1X system. However, according to the present invention, the hybrid access terminal can return to the 1xEV-DO mode before the call drop occurs between the hybrid access terminal and the 1xEV-DO system by limiting a search time for searching the 1X system, so that it is possible to solve the undesired call drop problem.

In addition, according to the present invention, the hybrid access terminal itself checks the time for searching the 1X system and returns to the 1xEV-DO mode without using resources of the 1X system and the 1xEV-DO system, thereby preventing waste of communication resources and preventing the 1xEV-DO system from being subject to overload.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A system for preventing a call drop from occurring between a CDMA 2000 1xEV-DO (Evolution-Data Optimized) system and a hybrid access terminal in traffic with the CDMA 2000 1xEV-DO system, by limiting a predetermined search time for a 1X system, the system comprising:

the hybrid access terminal operated in a 1X mode in relation to the 1X system for receiving a voice signal transmission service or a low-rate data transmission service from the 1X system and in a 1xEV-DO mode in relation to the 1xEV-DO system for receiving a high-rate data transmission service from the 1xEV-DO system, the hybrid access terminal in traffic with the 1xEV-DO system being periodically switched into the 1X mode so as to update overhead messages and being forced to return to the 1xEV-DO mode if the predetermined search time lapses;

a base station transceiver subsystem including a 1xEV-DO access network transceiver for transmitting/receiving packet data to/from the hybrid access terminal and a 1X transceiver for transmitting/receiving voice or data to/from the hybrid access terminal;

a base station controller including a 1xEV-DO access network controller for controlling a packet data transmission service of the 1xEV-DO access network transceiver and a 1X controller for controlling a transmission service of the 1X transceiver; and a packet data serving node (PDSN) connected to the 1xEV-DO access network controller so as to transmit/receive the packet data to/from the 1xEV-DO system, wherein a TDMA (time division multiple access) method is utilized in the case of a forward link transmitting data from the 1xEV-DO system to the hybrid access terminal, and a CDMA (code division multiple access) method is utilized in the case of a reverse link transmitting data from the hybrid access terminal to the 1xEV-DO system, and wherein a hard handoff is carried out in the case of the forward link by transmitting data with maximum power without performing power control, and a soft handoff is carried out in the case of the reverse link while performing the power control with respect to each hybrid access terminal.

2. The system as claimed in claim 1, wherein the predetermined search time is a time required for updating the overhead messages used for a location register and a call request in the 1X system after the hybrid access terminal in traffic with the 1xEV-DO system is switched into the 1X mode.

3. The system as claimed in claim 1, wherein the hybrid access terminal stops a search work for the 1X system if a time for switching the hybrid access terminal into the 1X mode reaches the predetermined search time and returns to the 1x EV-DO mode.

4. The system as claimed in claim 1, wherein the hybrid access terminal is set to the 1X mode in an idle state thereof in order to make communication with the 1X system and is periodically switched into the 1xEV-DO mode in a predetermined period of time so as to check whether or not data are received through the 1xEV-DO system and returns to the 1X mode.

5. The system as claimed in claim 1, wherein the hybrid access terminal receiving high-rate data from the 1xEV-DO system in the 1xEV-DO mode is periodically switched into the 1X mode in a predetermined period of time so as to check whether or not signals are received through the 1X system and returns to the 1xEV-DO mode.

6. The system as claimed in claim 1, wherein the hybrid access terminal is switched from the 1xEV-DO mode into the 1X mode by tracking frequency of the 1X system under the control of a mobile station modem (MSM) chip.

7. The system as claimed in claim 1, wherein the forward link includes a pilot channel used for transmitting a pilot signal allowing the 1xEV-DO system to track the hybrid access terminal, a MAC (medium access control) channel used for controlling the reverse link, a control channel used for transmitting a broadcast message or a direct message for directly controlling a specific hybrid access terminal from the 1xEV-DO system to the hybrid access terminal, and a traffic channel used for transmitting only packet data from the 1xEV-DO system to the hybrid access terminal.

8. The system as claimed in claim 1, further comprising a mobile switching center for providing a communication access route of the 1X system with respect to a communication call transmitted from the hybrid access terminal by switching the communication access route.

9. The system as claimed in claim 1, wherein the hybrid access terminal comprises:

a timer configured to measure a switching time when the hybrid access terminal is switched from the 1xEV-DO mode to the 1X mode;

a searcher module configured to track and convert frequencies so as to perform switching of the hybrid access terminal between the 1X mode and the 1xEV-DO mode, and receiving the overhead messages;

a finger module configured to demodulate the overhead messages received from the searcher module; and a mobile station modem (MSM) chip alternately and periodically search the 1xEV-DO system and the 1X system, create a return control signal if the MSM chip receives a return start signal from the timer while searching the 1X system, and deliver the return control signal to the searcher module so as to force the searcher module to switch from the 1x mode to the 1xEV-DO mode.

10. The system as claimed in claim 9, wherein the timer creates the return start signal if the measured switching time reaches the predetermined return start time to deliver the return start signal to the MSM chip.

11. The system as claimed in claim 9, wherein the hybrid access terminal searches frequencies used in the 1X system or 1xEV-DO system according to a predetermined monitoring period so as to be operated in the 1X mode or 1xEV-DO mode.

12. The system as claimed in claim 9, wherein the MSM chip has information about the return start time, and checks the switching time measured by the timer to create and deliver the return control signal if the switching time reaches to the return start time.

13. A method for preventing a call drop from occurring between a CDMA 2000 1xEV-DO (Evolution-Data Optimized) system and a hybrid access terminal in traffic with the CDMA 2000 1xEV-DO system, by limiting a predetermined search time for a 1X system, the method comprising the steps of:

(a) sequentially initializing a 1X mode and a 1xEV-DO mode of the hybrid access terminal such that the hybrid access terminal stays in an idle state;

(b) alternately and periodically performing monitoring with respect to the 1X system and the 1xEV-DO by using the hybrid access terminal in a state that the hybrid access terminal stays in the idle state;

(c) allowing the hybrid access terminal to enter a traffic state of the 1xEV-DO mode such that a connection and a session are formed between the hybrid access terminal and the 1xEV-DO system, thereby enabling the hybrid access terminal to transmit/receive packet data to/from the 1xEV-DO system;

(d) switching the hybrid access terminal into the 1X mode if a predetermined monitoring time lapses;

(e) checking a switching time and detecting signals of the 1X system when the hybrid access terminal is switched into the 1X mode; and (f) forcing the hybrid access terminal to return to the 1xEV-DO mode if the switching time reaches a predetermined return start time, wherein, in step (e), the predetermined return start time is shorter than a call drop time required for the call drop between the hybrid access terminal and the 1xEV-DO system, and wherein the predetermined return start time is set as integer times of SCI (slot cycle index).

14. The method as claimed in claim 13, wherein, in step (a), the hybrid access terminal initializes the 1xEV-DO mode by using system parameters obtained when initializing the 1X mode.

15. The method as claimed in claim 13, wherein, in step (d), the predetermined monitoring time is 5.12 seconds, which is counted after the hybrid access terminal is switched into the 1xEV-DO mode.

16. The method as claimed in claim 13, wherein, in step (e), the predetermined return start time is the switching time at which the hybrid access terminal switched into the 1X mode so as to detect the signals of the 1X system starts to return to the 1xEV-DO mode.

17. The method as claimed in claim 13, wherein the predetermined return start time is set as 3.36 seconds or 4.48 seconds.

18. The method as claimed in claim 13, wherein, in step (e), the hybrid access terminal stores the overhead messages received therein while detecting the 1X system in a predetermined memory.

19. The method as claimed in claim 13, wherein, in step (f), an operation of allowing the hybrid access terminal to return to the 1xEV-DO mode is performed through a searcher module, which tracks frequencies used in the 1xEV-DO system under a control of an MSM chip accommodated in the hybrid access terminal.

20. The method as claimed in claim 13 wherein the hybrid access terminal uses the essential overhead messages received and stored during a previous search of the 1X system for a next search of the 1X system.

21. The method as claimed in claim 20, wherein the overhead messages include at least one of a system parameter message, an access parameter message, an extended system parameter message, a neighbor list parameter message, and a channel 1 st parameter message.

* * * * *